(12) United States Patent
Marupaduga et al.

(10) Patent No.: US 11,134,530 B1
(45) Date of Patent: Sep. 28, 2021

(54) USE OF CAPABILITY REPORTING BASED ON PING-PONGING AS BASIS TO FACILITATE CONTROL OF DUAL CONNECTIVITY

(71) Applicant: Sprint Spectrum L.P., Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/929,202

(22) Filed: Jan. 9, 2020

(51) Int. Cl.
*H04L 1/18* (2006.01)
*H04W 76/15* (2018.01)
*H04W 72/12* (2009.01)
*H04W 8/24* (2009.01)
*H04W 92/10* (2009.01)

(52) U.S. Cl.
CPC .............. *H04W 76/15* (2018.02); *H04W 8/24* (2013.01); *H04W 72/1273* (2013.01); *H04W 92/10* (2013.01)

(58) Field of Classification Search
CPC ...... H04L 47/34; H04W 72/14; H04W 48/20; H04W 76/16; H04W 72/082; H04W 36/02; H04B 7/0617
See application file for complete search history.

(56) References Cited

U.S. PATENT DOCUMENTS

| | | | |
|---|---|---|---|
| 9,820,297 B2 | 11/2017 | Huang et al. | |
| 9,973,951 B1 | 5/2018 | Rai et al. | |
| 2014/0274063 A1 | 9/2014 | Singh et al. | |
| 2016/0021585 A1 | 1/2016 | Pedersen et al. | |
| 2018/0206113 A1 | 7/2018 | He et al. | |
| 2020/0252847 A1* | 8/2020 | Park | H04W 88/14 |

OTHER PUBLICATIONS

U.S. Appl. No. 16/540,524, filed Aug. 14, 2019.

* cited by examiner

*Primary Examiner* — Phuoc H Doan

(57) ABSTRACT

A method and system for controlling connectivity of a user equipment device (UE), the UE being dual-connectivity capable. The UE detects that the UE has ping-ponged at a threshold high rate between standalone connectivity and dual connectivity. And responsive to at least detecting that the UE has ping-ponged at the threshold high rate between standalone connectivity and dual connectivity, the UE transmits, to an access node serving the UE, a report including an indication that the UE is not dual-connectivity capable, even though the UE is dual-connectivity capable. The access node could then use the indication in the report as a basis to forgo configuring of dual connectivity for the UE, which could thereby help discontinue the ping-ponging.

18 Claims, 5 Drawing Sheets

USE OF CAPABILITY REPORTING BASED ON PING-PONGING AS BASIS TO FACILITATE CONTROL OF DUAL CONNECTIVITY

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use.

Further, on the downlink and uplink, each carrier could be structured to define various physical channels including time-frequency resources for carrying information between the access nodes and UEs. For example, the air interface could be divided over time into frames, each divided in turn into subframes and timeslots, and the carrier bandwidth (frequency width of the carrier on the downlink and/or uplink) could be divided over frequency into subcarriers, which could be grouped within each subframe and timeslot to define physical resource blocks (PRBs) in which the subcarriers can be modulated to carry data.

In addition, certain resources on the downlink and/or uplink of each such carrier could be reserved for special purposes. For instance, on the downlink, certain resources could be reserved to define a synchronization signal that UEs could detect as an indication of the presence of coverage and a reference signal that UEs could measure in order to determine coverage strength, other resources could be reserved to carry downlink control-plane signaling from the access node to UEs, and other resources could be reserved to carry user-plane communications from the access node to UEs. And on the uplink, certain resources could be reserved to carry uplink control-plane signaling from UEs to the access node, and other resources could be reserved to carry user-plane communications from UEs to the access node.

Overview

When a UE enters into coverage of an example network, the UE could detect threshold strong coverage of an access node on a particular carrier (e.g., a threshold strong reference signal broadcast by the access node on that carrier) and could then engage in random-access and connection signaling, such as Radio Resource Control (RRC) signaling, to establish an air-interface connection (e.g., RRC connection) through which the access node will then serve the UE on the carrier.

Further, if the UE is not already registered for service with the core network, the UE could transmit to the access node an attach request, which the access node could forward to a core-network controller for processing. And the core-network controller and access node could then responsively coordinate setup for the UE of one or more user-plane bearers extending via the access node between the UE and a core-network gateway system that provides connectivity with a transport network.

Once the UE is so connected and registered, the access node could then serve the UE in a connected mode over the air-interface connection, coordinating downlink air-interface communication of packet data to the UE and uplink air-interface communication of packet data from the UE.

For example, with the air interface described above, when packet data for the UE arrives at the core network from a transport network, the data could flow to the UE's serving access node, and the access node could then schedule and provide transmission of that data to the UE on particular downlink PRBs of the UE's air-interface connection. Likewise, when the UE has data to transmit on the transport network, the UE could transmit a scheduling request over the air-interface connection to the access node, the access node could responsively schedule transmission of that data from the UE on particular uplink PRBs of the air-interface connection, and the UE could accordingly transmit the data to the access node for forwarding through the core network to the transport network.

When the industry advances from one generation of wireless technology to the next, or in other scenarios, networks and UEs may also support dual-connectivity service, where a UE is served on co-existing connections according to multiple different RATs.

For instance, a cell site (or a combination of cell sites for that matter) could be equipped with a first access node that provides service according to a first RAT and a second access node that provides service according to a second RAT, and a UE positioned within coverage of the cell site could have a first radio configured to engage in service according to the first RAT and a second radio configured to engage in service according to the second RAT. With this arrangement, the UE may be able to establish a first air-interface connection with the first access node according to the first RAT and a second air-interface connection with the second access node according to the second RAT, and the access nodes may then concurrently serve the UE over those connections according to their respective RATs.

Such dual-connectivity (or "non-standalone" connectivity) could help facilitate increased peak data-rate of communications, by multiplexing the UE's communications across the multiple air-interface connections. Further or alternatively, dual-connectivity may provide other benefits compared with serving a UE on a single connection according to a single RAT (as "standalone" connectivity).

In a representative dual-connectivity implementation, a cell site's first-RAT access node could function as a primary access node, responsible for coordinating setup and teardown of dual-connectivity service for the UE and functioning as an anchor point for RRC signaling and core-network control signaling related to the dual-connected UE, and the cell site's second-RAT access node could function as a secondary access node mainly to provide added connectivity and increased aggregate bandwidth for the UE.

When a UE that supports dual-connectivity service enters into coverage of such a cell site, the UE could initially scan for coverage on the first RAT, and the UE could detect coverage of the first access node on the first RAT and engage in signaling to establish a first air-interface connection between the UE and the first access node as discussed above. Further, the UE could engage in attach signaling with the core-network controller, and the core-network controller and access node could then coordinate setup for the UE of one or more user-plane bearers as discussed above. And the first access node could then serve the UE in a first-RAT standalone mode (i.e., under just the first RAT) with packet-data communications as described above.

In relation to the UE's attachment, and/or at another time, the UE could also provide the first access node with a capability report that indicates various capabilities of the UE, including for instance whether the UE is dual-connectivity capable. By way of example, if the UE is equipped with radios and associated circuitry and logic supporting dual-connectivity service, then the UE's capability report may specify that the UE is dual-connectivity capable. Whereas, if the UE is not so equipped, then the UE's capability report may specify that the UE is not dual-connectivity capable (or may omit any indication of dual-connectivity capability).

If the UE is dual-connectivity capable, the first access node could then trigger and/or engage in a process to establish for the UE a second-RAT connection with the second access node, so that the first and second access nodes can then cooperatively provide the UE with dual-connectivity service. For instance, the first access node could engage in RRC signaling with the UE to direct the UE to scan for coverage under the second RAT and could receive in response from the UE a measurement report indicating that the UE detected threshold strong coverage of the second access node. The first access node could then coordinate setup of dual-connectivity service for the UE to be served concurrently by the first and second access nodes.

While the specifics of setting up dual connectivity may vary from implementation to implementation, in an example, the first access node could engage in signaling with the second access node, with the UE, and with the core-network controller, to coordinate setup of the dual-connectivity service. For instance, the first access node could engage in signaling with the UE and with the second access node to arrange for setup of a second air-interface connection between the UE and the second access node, to support the second access node's air interface service of the UE. And the first access node could engage in signaling with the core-network controller, with the second access node, and with the UE, to set up of a split-bearer arrangement, so that the first access node and second access node could then each serve a respective portion of the UE's data communications.

Once dual connectivity is set up for the UE, the first and second access nodes could each serve the UE respectively in the manner discussed above for instance. For instance, each access node could respectively receive some downlink data destined to the UE and could schedule and provide transmission of the data on its respective air-interface connection with the UE. And when the UE has data to send, the UE could transmit a scheduling request respectively to each access node, each access node could responsively schedule transmission of that data from the UE on particular uplink PRBs of its respective air-interface connection with the UE, and the UE could accordingly transmit the data on the UE's first and second air-interface connections.

One technical issue that can arise in a system that supports dual-connectivity service is that, in some situations, a UE may repeatedly transition back and forth, i.e., ping-pong, between dual connectivity and standalone connectivity.

For instance, each time the UE is served with standalone first-RAT connectivity by the first access node, the first access node may determine that the UE supports dual connectivity and thus direct the UE to scan for coverage on the second RAT, the UE may responsively discover and report threshold strong coverage of the second access node, and the first access node may responsively engage in a process as discussed above to coordinate setup of dual-connectivity service for the UE. But each time the UE is served with dual-connectivity service by the first and second access nodes, quality of communication on the UE's second air-interface connection with the second access node may become threshold poor to the point that the first access node will responsively coordinate teardown of the UE's second air-interface connection, transitioning the UE from dual connectivity back to standalone first-RAT connectivity.

This ping-ponging between dual connectivity and standalone connectivity could occur for various reasons. Without limitation, for instance, RF interference on the UE's second air-interface connection could be fluctuating, perhaps due to the UE being at a cell edge and/or due to changes in the UE's environment. Other reasons could exist as well.

Unfortunately, this ping-ponging could have a detrimental impact on user experience, UE operation, and network operation. As to user-experience, for instance, the ping-ponging could result in a user of the UE experiencing inconsistent data throughput and perceiving the UE alternating between dual connectivity and standalone connectivity (perhaps with the UE switching on and off a dual-connectivity display icon). As to UE operation, the ping-ponging could result in increased battery drain resulting from the UE engaging in signaling and processing to switch between dual connectivity and standalone connectivity. And as to network operation, the ping-ponging may result in increased control-plane-signaling load in the network, related to processing each instance of setup or teardown of the UE's dual connectivity.

The present disclosure provides a mechanism to help address this technical issue, conveniently by leveraging UE-capability signaling. In accordance with the disclosure, a UE will detect that the UE has transitioned between dual-connectivity and standalone connectivity at a threshold high rate. And in response to detecting that ping-ponging, even though the UE may in fact be equipped with multiple radios and associated circuitry and logic that support dual-connectivity service, the UE will then provide the first access node with a capability report that indicates that the UE is not dual-connectivity capable. Providing the first access node with this capability report will cause the first access node to update its record of the UE's capabilities to indicate that the UE is not dual-connectivity capable, which will thereby cause the first access node to not set up dual-connectivity service for the UE again, thus stopping the UE's ping-ponging. This operational state could then remain in place for a defined period of time or until the UE sends an updated capabilities report.

Conveniently, having the UE report to the first access node when the UE has been ping-ponging between dual connectivity and standalone connectivity at a threshold rate could avoid the need for the first access node itself to monitor for such ping-ponging on a per UE basis. Further, using UE-capability reporting as the mechanism to stop further ping-ponging can advantageously leverage conventional UE-capability-reporting functionality, avoiding the need to introduce a new form of messaging for this purpose.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of 4G LTE, 5G NR, and 4G-5G dual connectivity, referred to as EUTRA-NR Dual Connectivity (EN-DC). With EN-DC, a 4G access node (4G evolved Node-B (eNB)) functions as the first access node, and a 5G access node (5G next-generation Node-B (gNB)) functions as the second access node. Thus, a UE would first establish a standalone-4G connection with a 4G eNB, and the 4G eNB could then coordinate setup of EN-DC service for the UE, including setup for the UE of a secondary 5G connection with the 5G gNB. And the 4G eNB and 5G gNB could then concurrently serve the UE over their respective 4G and 5G connections with the UE.

It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways.

Figure 1:
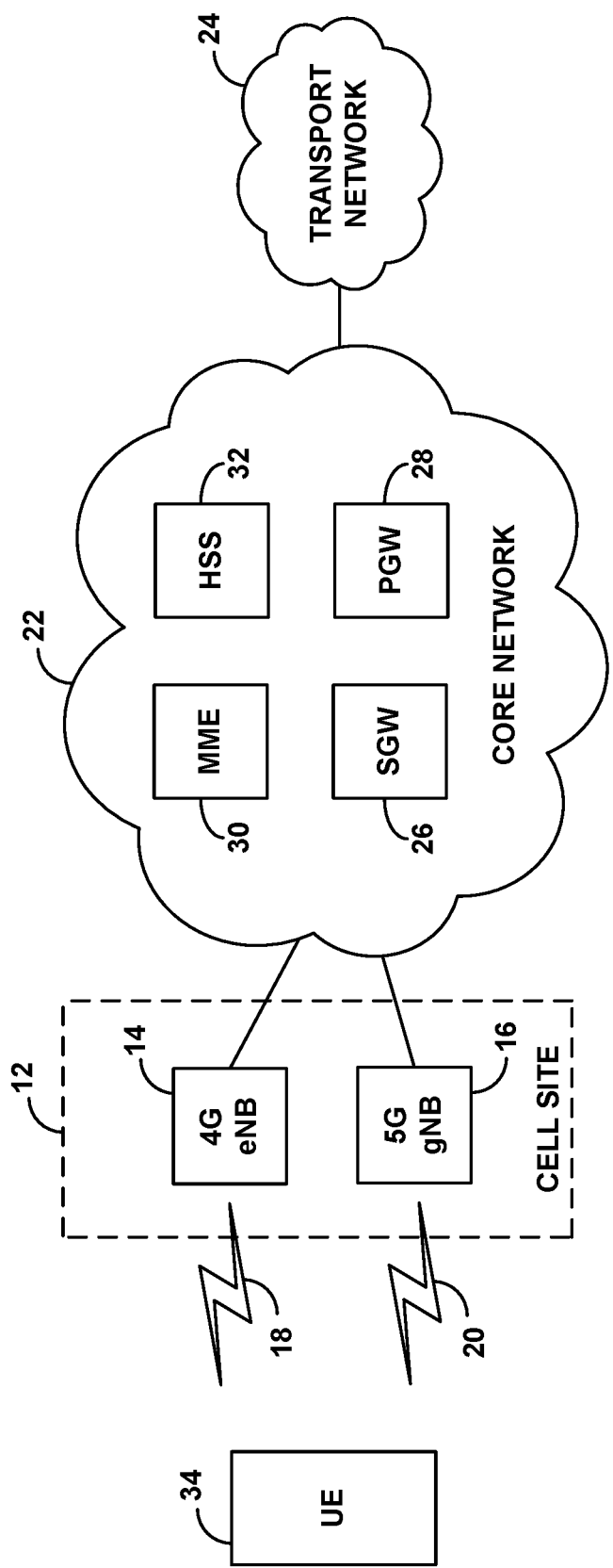
FIG. 1 is a simplified block diagram of an example network arrangement in which aspects of the present disclosure can be implemented.

FIG. 1 is a simplified block diagram of an example network arrangement having a cell site 12 that includes a 4G eNB 14 and a 5G gNB 16. These access nodes could be macro access nodes of the type configured to provide a wide range of coverage or could take other forms, such as small cell access nodes, repeaters, femtocell access nodes, or the like, possibly configured to provide a smaller range of coverage. The access nodes could also be different types than each other. And in an alternative arrangement, the access nodes could be located at different cell sites.

Each access node could have a respective and/or shared antenna structure that is configured to provide coverage and facilitate air-interface communication on one or more carriers according to a respective RAT. For instance, the 4G eNB 14 could provide 4G coverage 18 on one or more 4G carriers, and the 5G eNB 16 could provide 5G coverage 20 on one or more 5G carriers. In an example implementation, coverage provided by the 4G eNB 14 could overlap at least partially with coverage provided by the 5G gNB 16, so that a UE could be served concurrently by both access nodes.

The 4G eNB 14 and 5G gNB 16 are each shown coupled with an example core network 22. Core network 22 could be an evolved packet core (EPC) network, a next generation core (NGC) network, or another network including components supporting an applicable radio access technology and providing connectivity with at least one transport network 24, such as the Internet. Alternatively, the access nodes could be coupled with different core networks.

In an example implementation as shown, the core network 22 includes a serving gateway (SGW) 26, a packet data network gateway (PGW) 28, a mobility management entity (MME) 30, and a home subscriber server (HSS) 32. With this arrangement, the SGW 26 and PGW 28 could cooperatively provide user-plane connectivity, to enable a UE served by an access node to engage in communication on the transport network. Further, the MME 30 could operate as a core-network controller to carry out operations such as coordinating UE attachment and setup of user-plane bearers. And the HSS 32 could store UE profile records, which could specify service-subscription plans, UE configurations, and/or UE capability information, such as whether a UE is EN-DC capable for instance.

As noted above, the air interface between each access node and UEs within its coverage could be structured to define various air-interface resources.

By way of example, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the access node operates could be divided into subcarriers with specified subcarrier spacing on the order of 15 to 240 kHz. With this example arrangement, the air interface on each carrier would define an array of resource elements each occupying a subcarrier and symbol time segment, and the access node and UEs could communicate with each other through modulation of the subcarriers to carry data in those resource elements. Variations of this arrangement are possible as well.

Further, particular sets of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the access node to UEs. And other resource elements per subframe could be reserved to define a shared channel in which PRBs could carry scheduled data communications from the access node to UEs.

Further, in certain subframes, a group of resource elements centered on the center frequency of each carrier could be reserved to carry synchronization signals that UEs could detect as a way to discover coverage of the access node on the carrier and to establish frame timing. And in certain subframes, a group of resource elements also centered on the center frequency of the carrier could be reserved to define a broadcast-channel for carrying system information messages, such as master information block (MIB) and system information block (SIB) messages that UEs could read to obtain operational parameters such as carrier bandwidth (e.g., downlink bandwidth and/or uplink bandwidth) and other information. Further, certain resource elements distributed in a predefined pattern throughout the carrier bandwidth per subframe could be reserved to carry reference signals that UEs could measure as a basis to evaluate coverage strength and quality and to provide channel estimates to facilitate precoding, beamforming, or the like.

On the uplink, on the other hand, certain resource elements per subframe (or per uplink subframe in TDD) could be reserved to define an uplink control region for carrying control signaling such as access requests, channel-quality reports, scheduling requests, and acknowledgements, from UEs to the access node. And other resource elements per subframe could be reserved to define a shared channel in which PRBs could carry scheduled data communications from UEs to the access node. Further, still other resources on the uplink could be reserved for other purposes as well, such as for carrying uplink reference signals or the like.

Note also that the 4G air interface and 4G service provided by the 4G eNB 14 on each 4G carrier could differ from the 5G air interface and 5G service provided by the 5G gNB 16 on each 5G carrier in various ways now known or later developed. For example, one may provide variable subcarrier spacing, but the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

FIG. 1 also shows a representative UE 34 within coverage of both the 4G eNB 14 and the 5G gNB 16. UE 30 could be one of possibly many UEs in coverage of the cell site 12 at any given time.

In an example implementation, UE 34 supports 4G service, 5G service, and EN-DC service. For instance, the UE could include a 4G radio and associated RF circuitry for engaging in 4G service over a connection with 4G eNB 14 and a 5G radio and associated RF circuitry for engaging in 5G service over a connection with 5G gNB 16, and the UE could include control logic to enable the UE to engage in EN-DC service, operating concurrently with a 4G connection and a 5G connection.

When UE 34 enters into coverage of the 4G eNB 14, the UE could detect coverage of the 4G eNB 14 on a 4G carrier, and the UE could determine coverage strength from the 4G eNB 14 on that carrier, such as reference signal receive strength (RSRP) or reference signal receive quality (RSRQ), among other possibilities. If the UE determines that that coverage is sufficiently strong, the UE could then engage in random access signaling and RRC configuration signaling with the 4G eNB 14 as discussed above to establish a 4G connection with the 4G eNB 14 on the carrier, thus putting the UE in an RRC-connected mode. Further, the 4G eNB 14 could establish in data storage a context record for the UE and could store in the context record an identification of the UE's established 4G connection and an identification of the 4G carrier on which the UE is connected with the 4G eNB 14.

In addition, once the UE is connected with the 4G eNB 14, the UE could then transmit to the 4G eNB 14 an attach request, which the 4G eNB 14 could forward to the MME 30 for processing. And after authenticating the UE, the MME 30 could then coordinate setup for the UE of one or more user-plane bearers. For instance, for each such bearer, the MME could engage in signaling with the 4G eNB 14 and the SGW 26 to set up for the UE an S1-U tunnel between the 4G eNB 14 and the SGW 26, the SGW 26 could responsively engage in signaling with the PGW 28 to set up for the UE an S5 tunnel between the SGW 26 and the PGW 28, and the 4G eNB 14 could engage in signaling with the UE to set up for the UE a data radio bearer (DRB) between the UE and the 4G eNB 14. Further, the 4G eNB 14 could record the operational state of the UE in the UE context record.

In relation to this attachment process and/or at another time, the 4G eNB could also obtain capabilities data regarding the UE and could store the capabilities data in the UE context record for reference while serving the UE.

By way of example, as a last step of the attachment process, the 4G eNB 14 could transmit to the UE an RRC message carrying a UE-capability enquiry, and the UE could respond to the 4G eNB 14 with a "UE capability information" information element (IE). This UE capability information IE could take various forms. For instance, the IE could include a set of feature group indicator (FGI) bits, each mapped to a particular capability, and each having a value (0 or 1) indicating whether or not the UE has that capability. And the UE and 4G eNB 14 could each be configured to understand these bits and their mappings, so that the UE transmitting the FGI bits to the 4G eNB 14 could function to inform the 4G eNB 14 what capabilities the UE has and does not have. The UE capability information IE that the UE transmits to the 4G eNB 14 in this process could constitute an UE's initial report of the UE's capabilities, i.e., an initial UE-capability report.

At least one of the FGI bits that the UE includes in this UE capability information IE could specify whether or not the UE supports EN-DC service. By setting that bit to a value of 1 in its initial capability information IE to the 4G eNB 14, for instance, the UE could indicate that it supports EN-DC service as noted above, which may be the case as a basic matter as the UE is equipped with 4G and 5G radios and associated circuitry and logic that enables the UE to engage in EN-DC service.

Alternatively, the 4G eNB 14 could obtain an initial report of the UE's capabilities from the MME 30. For instance, the MME 30 could obtain UE capabilities data from the HSS 32 and could covey the data to the 4G eNB 14 for storage. Other examples are possible as well.

Once the UE is connected and attached, the 4G eNB 14 could then provide the UE with standalone 4G service in the manner noted above.

For instance, when data arrives at the 4G eNB 14 for transmission to the UE, the 4G eNB 14 could allocate one or more downlink PRBs in a subframe on the UE's 4G connection, for use to transmit at least a portion of the data, defining a transport block, to the UE. The 4G eNB 14 could then transmit to the UE in the control region of that subframe on the UE's 4G connection a Downlink Control Information (DCI) message that designates the allocated PRBs, and the 4G eNB 14 could accordingly transmit the transport block to the UE in those designated PRBs on the UE's air interface connection.

For each such downlink transmission, the UE could then determine if the UE received transport block successfully. For instance, the transmission could carry a cyclic redundancy check (CRC) value computed based on the transport block, and the UE could compute a CRC based on the received transport block and determine whether its computed CRC matches that carried by the transmission. If the UE receives the transmission and determines that the CRC matches or otherwise that the UE received the transport block successfully, then the UE could transmit to the 4G eNB 14 a positive acknowledgement (ACK) control message, and the 4G eNB 14 could then proceed with transmission of a next transport block (if any) to the UE. Whereas, if the UE did not receive the transmission or determined that the CRC did not match and thus that there was an error in the received transport block, defining a block error, then the UE could transmit to the 4G eNB 14 a negative acknowledgement (NACK), in response to which the 4G eNB 14 could attempt the transmission again.

On the other hand, when the UE has data to transmit to the 4G eNB 14 (e.g., for transmission on the transport network), the UE could transmit to the 4G eNB 14 on an uplink control channel (e.g., on a physical uplink control channel (PUCCH)) of the UE's 4G connection a scheduling request that carries with it a buffer status report (BSR) indicating how much data the UE has buffered for transmission to the 4G eNB 14. And in response, the 4G eNB 14 could allocate one or more uplink PRBs in an upcoming subframe on the UE's 4G connection for carrying a transport block of that data from the UE and could transmit to the UE on the UE's air-interface connection a DCI message that designates those upcoming PRBs. The UE could then accordingly transmit the transport block to the 4G eNB 14 in the designated PRBs on the UE's air-interface connection.

As with downlink transmission, for each transport block that the UE transmits to the 4G eNB 14, the 4G eNB 14 could determine if the transport block arrived successfully, based on a CRC analysis for instance. And if the 4G eNB received the transmission successfully, then the 4G eNB 14 could transmit to the UE an ACK and could schedule a next uplink transmission from the UE. Whereas, if the 4G eNB 14 did not receive the transmission successfully, then the access node could transmit to the UE a NACK, and the UE could attempt retransmission to the 4G eNB 14.

In addition, based on the UE capabilities data indicating that the UE supports EN-DC service, the 4G eNB 14 could work to configure EN-DC service for the UE. In particular, the 4G eNB 14 could read the capabilities data and determine from the data that the UE supports EN-DC service, and in response to at least that determination, the 4G eNB 14 could engage in a process to configure EN-DC service for the UE.

For instance, the 4G eNB 14 could direct the UE to scan for 5G coverage and could receive in response from the UE a measurement report indicating that the UE has detected threshold strong coverage of 5G gNB 16. The 4G eNB 14 could then engage in signaling with the 5G gNB 16 and with the UE to configure a 5G connection for the UE, including configuration of a DRB and other service parameters to support the 5G gNB 16 serving the UE. Further, the 4G eNB 14 could engage in signaling with the MME 30, with the 5G gNB 16, and with the UE, to facilitate setup of a split-bearer arrangement, so that the 4G eNB 14 and 5G gNB 16 could then each serve a respective portion of the UE's data communications.

Various split-bearer arrangements are also possible.

In one example arrangement, for instance, for each of one or more user-plane bearers established for the UE, the UE's established S1-U tunnel could remain between the 4G eNB 14 and the SGW 26, and the 4G eNB 14 and 5G gNB 16 could coordinate transfer of some of the UE's data communications over an X2 interface between the 4G eNB 14 and 5G gNB 16. A portion of the UE's data communications could then flow between the 4G eNB 14 and the UE over the UE's 4G connection, and another portion of the UE's data communications could flow between the 5G gNB 16 and the UE over the UE's 5G connection, and both portions could flow over the UE's S1-U between the 4G eNB 14 and the SGW 26.

Alternatively, in another example arrangement, for each such user-plane bearer, the UE's established S1-U could be shifted from being between the 4G eNB 14 and the SGW 26 to being instead between the 5G gNB 16 and the SGW 26, and the 4G eNB 14 and 5G gNB 16 could likewise coordinate transfer of some of the UE's data communications over the X2 interface. Here too, a portion of the UE's data communications could then flow between the 4G eNB 14 and the UE over the UE's 4G connection, and another portion of the UE's data communications could flow between the 5G gNB 16 and the UE over the UE's 5G connection, but both portions would flow over the UE's S1-U between the 5G gNB 16 and the SGW 26. Other examples are possible as well.

With EN-DC configured for the UE, the 4G eNB 14 and 5G gNB 16 could then concurrently serve the UE over their respective connections with the UE, each in the manner noted above for instance. That is, the 4G eNB 14 could continue to serve the UE over the UE's 4G connection as discussed above, and the 5G gNB 16 could do the same over the UE's 5G connection.

Thus, as each access node receives data for transmission to the UE, the access node could schedule and provide transmission of the data to the UE on the UE's air-interface connection with the access node, the UE could transmit ACK/NACK messaging to the access node based on CRC analyses or the like, and the access node could retransmit to the UE when appropriate. And as the UE has data to transmit to an access node, the access node could schedule transmission of the data from the UE on the UE's air-interface connection with the access node and the UE could provide the transmission accordingly, the access node could transmit ACK/NAK messaging to the UE based on CRC analyses or the like, and the UE could retransmit to the access node when appropriate.

When the UE is so served with EN-DC by the 4G eNB 14 and the 5G gNB 16, the 4G eNB 14—as the UE's primary serving access node—could also monitor to determine when quality of communication on the UE's 5G connection with the 5G gNB 16 becomes threshold poor. And when the 4G eNB 14 detects that quality of communication on the UE's 5G connection with the 5G gNB 16 becomes threshold poor, the 4G eNB 14 could responsively coordinate teardown of the UE's 5G connection, thus transitioning the UE from EN-DC back to standalone 4G connectivity as noted above.

The 4G eNB 14 could detect the threshold poor quality of communication on the UE's 5G connection in various ways, considering downlink quality and/or uplink quality, and considering one or more metrics, such signal strength, signal-to-noise ratio, extent of retransmissions, noise level, packet error rate, block error rate, bit error rate, power headroom, and/or others now known or later developed.

Without limitation, for instance, the 4G eNB 14 could determine when there has been a threshold high block error rate (BLER) of communications between the UE and the 5G gNB 16 and or a threshold high rate of re-transmissions of communications between the UE and the 5G gNB 16. For instance, as the 5G gNB 16 serves the UE, the UE and/or 5G gNB 16 could keep track of the rate of block errors and/or retransmissions for communications between the UE and the 5G gNB 16, over a sliding window of time. When the rate of block errors and/or retransmissions becomes at least as high as a predefined high threshold level, the UE and/or 5G gNB could then transmit an associated report to the 4G eNB 14. For example, the UE could transmit this report over the UE's 4G connection to the 4G eNB 14, and/or the 5G gNB 16 could transmit this report over an X2 interface to the 4G eNB 14.

In response to detecting the threshold poor quality of communication on the UE's 5G connection, the 4G eNB 14 could then coordinate teardown of the UE's 5G connection and deconfiguration of the UE's EN-DC service by reversing the EN-DC-setup process discussed above. For instance, the 4G eNB 14 could engage in signaling with the 5G gNB 16 and with the UE to release the UE's 5G connection. Further, the 4G eNB 14 could engage in signaling with the MIME 30, with the 5G gNB 16, and with the UE, to deconfigure the split-bearer arrangement.

And the 4G eNB 14 could then proceed to provide the UE once again with standalone 4G service.

As noted above, the present disclosure provides for the UE monitoring the UE's rate of transitioning back and forth between EN-DC and standalone 4G connectivity and, in response to detecting that the rate of that transitioning is threshold high, the UE reporting to the 4G eNB that the UE is not EN-DC-capable, even though the UE is in fact EN-DC capable.

The UE could detect in various ways that the UE's rate of transitioning back and forth between EN-DC and standalone 4G connectivity is threshold high. By way of example, the UE could keep timestamped records of the UE's transitions from standalone 4G connectivity to EN-DC and the UE's transitions from EN-DC to standalone 4G connectivity. And the UE could monitor those records to determine a rate the UE transitioning from standalone 4G connectivity to EN-DC and then back to standalone 4G connectivity (or likewise from EN-DC to standalone 4G connectivity and then back to EN-DC) over a defined sliding window of time and to determine when that rate is threshold high. Without limitation, a representative threshold here could be that the UE transitioned back and forth at least two times in a defined small time period.

In response to detecting that the UE's rate of transitioning back and forth between EN-DC and standalone 4G connectivity is threshold high, the UE could then report to the 4G eNB 14 that the UE is not EN-DC capable, even though the UE is actually equipped with radios, circuitry, and logic for engaging in EN-DC service. For example, the UE could generate and transmit to the 4G eNB 14 an updated capability report, such as an updated string of FGI bits in an updated UE capability information IE for instance, with the EN-DC-capability bit cleared (i.e., set to zero) to indicate that the UE does not support EN-DC service. And the 4G eNB 14 could accordingly update the capabilities data in the UE's context record to indicate that the UE is not EN-DC-capable.

Based at least on this report of the UE not being EN-DC capable, the 4G eNB 14 could thus forgo a further attempt to configure EN-DC for the UE. (In addition, the 4G eNB 14 could also responsively de-configure EN-DC for the UE if EN-DC is already configured for the UE.) For instance, when the 4G eNB 14 is providing the UE with standalone 4G service, the 4G eNB 14 could determine from the UE capabilities data that the UE is not EN-DC capable and could therefore forgo attempting to set up EN-DC service for the UE, even though the UE is in fact EN-DC capable.

In an example implementation as noted above, the 4G eNB 14 could maintain this state of operation for a predefined period of time or until the UE sends a further updated capability report indicating that the UE is EN-DC capable.

Note that the above process could also work with multiple secondary access nodes, such as multiple 5G gNBs. In that scenario, for instance, the UE might transition from standalone 4G service provided by the 4G eNB 14 to EN-DC service provided by the 4G eNB 14 and one of the 5G gNBs and then back to standalone 4G service provided by the 4G eNB 14, and the UE might then transition from the standalone 4G service provided by the 4G eNB 14 to EN-DC service provided by the 4G eNB 14 and another one of the 5G gNBs and then again back to standalone 4G service provided by the 4G eNB 14, and so forth. In that case, the threshold high rate of the UE's ping-ponging between standalone 4G service and EN-DC service could encompass those transitions among possibly others.

Figure 2:
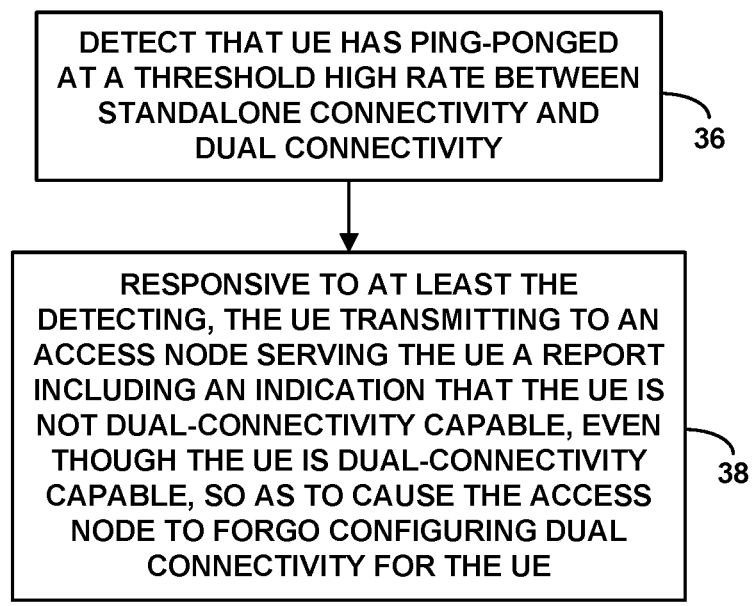
FIG. 2 is a flow chart depicting an example method in accordance with the disclosure.

FIG. 2 is a flow chart depicting a method for controlling connectivity of UE. This method could be carried out by a UE that is dual-connectivity capable.

As shown in FIG. 2, at block 36, the method includes the UE detecting that the UE has ping-ponged at a threshold high rate between standalone connectivity and dual connectivity. And at block 38, the method includes, responsive to at least the detecting that the UE has ping-ponged at the threshold high rate between standalone connectivity and dual connectivity, the UE transmitting to an access node serving the UE a report including an indication that the UE is not dual-connectivity capable, even though the UE is dual-connectivity capable. As discussed above, the access node could be configured to then use the indication in the report as a basis to forgo configuring of dual connectivity for the UE.

In line with the discussion above, the access node could be a first access node, and each of a plurality of instances of the UE ping-ponging between standalone connectivity and dual connectivity could include a sequence of steps such as (i) the UE transitioning from standalone connectivity with the first access node to dual connectivity with the first access node and a second node and then back to standalone connectivity with the first access node and (ii) the UE transitioning from dual connectivity with the first access node and a second node to standalone connectivity with the first access node and then back to dual connectivity with the first access node and the second access node.

Further, the act of detecting that the UE has ping-ponged at a threshold high rate between standalone connectivity and dual connectivity could involve detecting occurrence of at least a predefined quantity of the instances within a defined time period. Here, for instance, the predefined quantity could be at least two, and the defined time period could be a time period deemed to be short enough in relation to the predefined quantity to constitute too much ping-ponging.

As additionally discussed above, the report that the UE transmits to the access node could be an updated UE capability report, such as a report that updates capabilities data that the access node earlier received from the UE, from a core-network controller, or from another entity. Further, the indication in the report could include one or more feature group indicator bits indicating that the UE is not dual-connectivity capable.

Yet further, as discussed above, the act of forgoing configuring of dual connectivity for the UE could involve forgoing causing the UE search for coverage for a secondary connection for the UE. And alternatively or additionally, the access node could be a first access node, the UE could have a primary air-interface connection between the UE and the first access node, and the act of forgoing configuring of dual connectivity for the UE could involve forgoing signaling for setup of a secondary air-interface connection between the UE and a second access node.

Still further, as discussed above, the dual connectivity could be EN-DC, and wherein the standalone connectivity could be standalone 4G LTE connectivity, among other possibilities.

Figure 3:
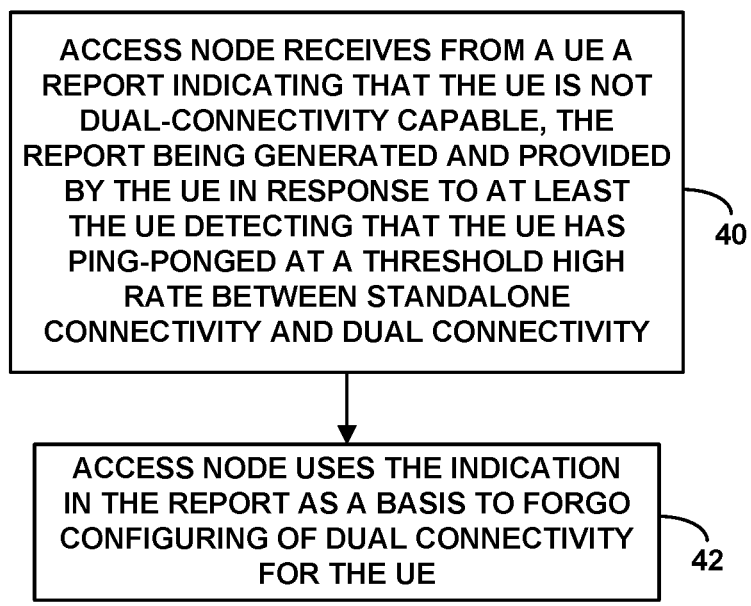
FIG. 3 is another flow chart depicting an example method in accordance with the disclosure.

FIG. 3 is next another flow chart depicting a method for controlling connectivity of a UE that is dual-connectivity capable. This method could be carried out by an access node that is serving the UE.

As shown in FIG. 3, at block 40, the method includes the access node receiving from the UE a report indicating that the UE is not dual-connectivity capable, the report being generated and provided by the UE in response to at least the UE detecting that the UE has ping-ponged at a threshold high rate between standalone connectivity and dual connectivity. And at block 42, the method includes the access node using the indication in the report as a basis to forgo configuring of dual connectivity for the UE.

Various features discussed above can be implemented in this context as well, and vice versa.

Figure 4:
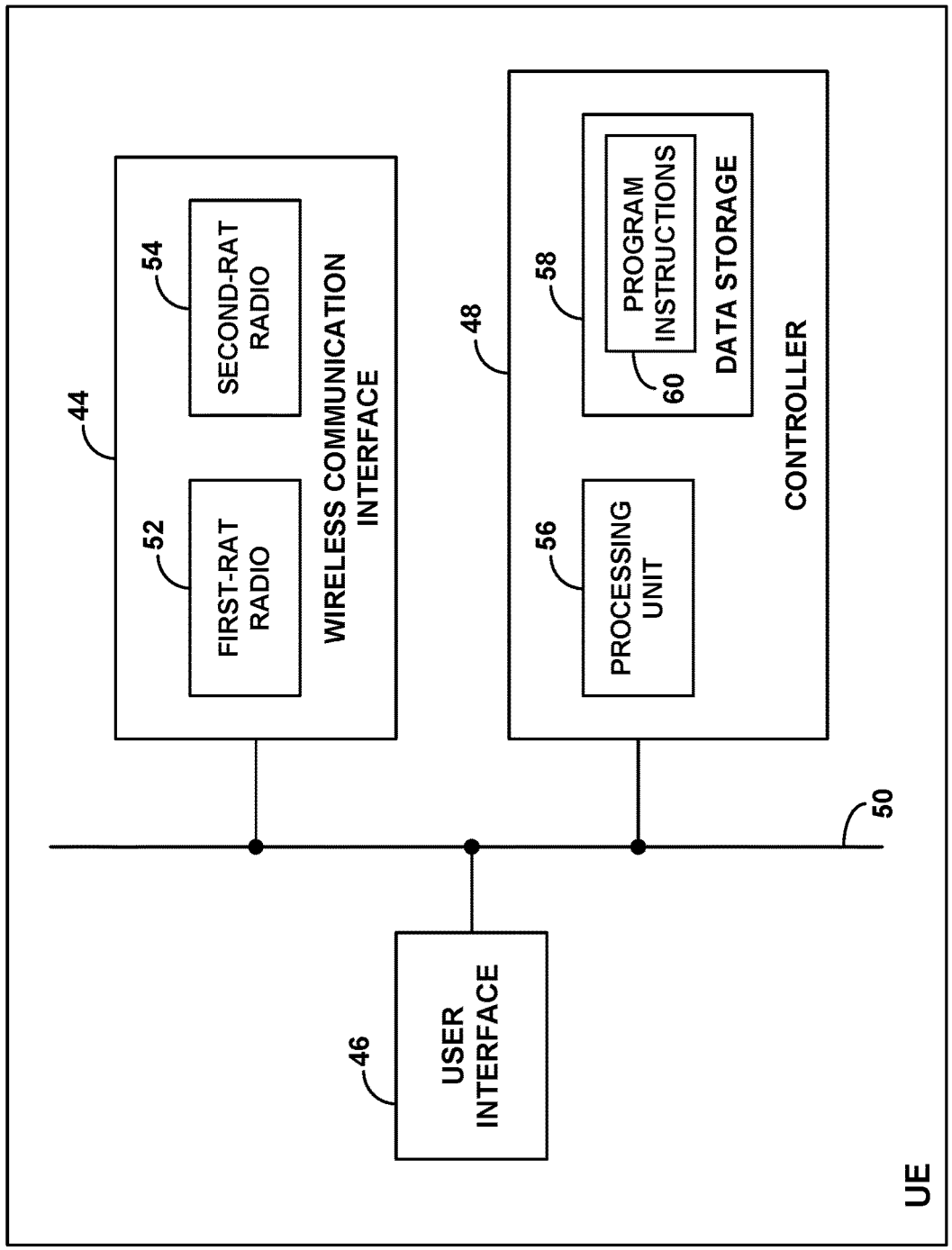
FIG. 4 is a simplified block diagram of an example UE operable in accordance with the disclosure.

FIG. 4 is next a simplified block diagram of an example UE, showing some of the components that could be included to facilitate carrying out operations as described above, to use capability reporting based on ping-ponging as a way to control connectivity of the UE. As shown in FIG. 4, the example UE includes a wireless communication interface 44, a user interface 46, and a controller 48. These components could be interconnected, integrated, and/or communicatively linked together in various ways now known or later developed, such as by a system but or other connection mechanism 50 for instance.

Wireless communication interface 44 operates to facilitate air interface communication and is equipped to support both standalone connectivity and dual connectivity as discussed above, so the UE is both standalone-connectivity capable and dual-connectivity-capable. As such, the wireless communication interface shown including a first-RAT radio 52 (e.g., a 4G LTE radio) and a second-RAT radio 54 (e.g., a 5G NR radio), and the wireless communication interface could include other components (not shown) such as power amplifiers, filters, and antenna structures, to facilitate standalone and dual connectivity operation.

User interface 46, which could be included if the UE is user operated, could include input and output components (not shown) to facilitate interaction with a user. For instance, the user interface could include analog-to-digital conversion circuitry and could include input components such as a touch screen, microphone, and keypad, and output components such as a display screen and sound speaker.

And controller 48, which could be integrated with wireless communication interface 44 (e.g., on a common chipset) or provided in another manner could operate to carry out or cause the UE to carry out various operations described herein, such as to (i) detect that the UE has ping-ponged at a threshold high rate between standalone connectivity and dual connectivity and (ii) responsive to at least the detecting that the UE has ping-ponged at the threshold high rate between standalone connectivity and dual connectivity, output for transmission to an access node serving the UE a report including an indication that the UE is not dual-connectivity capable. As discussed above, the indication in the report could then be useable by the access node as a basis to forgo configuring of dual connectivity for the UE.

As shown, controller 48 could include a processing unit 56 (e.g., one or more general purpose processors such as microprocessors and/or one or more special purpose processors such as application specific integrated circuits), and non-transitory data storage 58 (e.g., one or more volatile and/or non-volatile storage components, such as magnetic, optical and/or flash storage). And non-transitory data storage 58 could hold program instructions 60, which could be executable by the processing unit 56 to carry out the various described operations. Alternatively, the controller could take other forms.

Various features discussed above can be implemented in this context as well, and vice versa.

Figure 5:
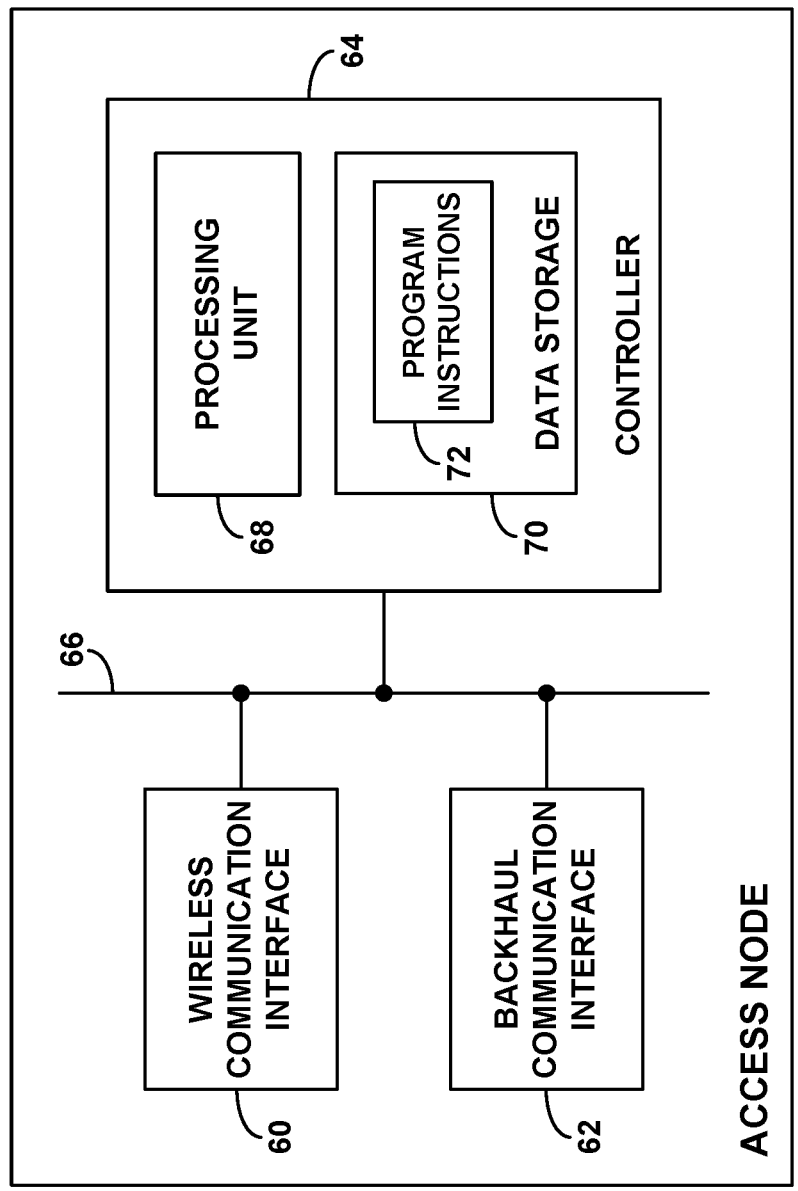
FIG. 5 is a simplified block diagram of an example access node operable in accordance with the disclosure.

Finally, FIG. 5 is a simplified block diagram of an example access node, which could represent a 4G eNB in the example implementation discussed above for instance, among other possibilities.

As shown in FIG. 5, the example access node includes a wireless communication interface 60, a backhaul communication interface 62, and a controller 64, which could be integrated together and/or communicatively linked by a network, system bus, or other connection mechanism 66.

Wireless communication interface 60 could include various components (not shown) such as a radio, power amplifiers, filters, and antenna structures, to facilitate air interface communication and serving of UEs according to an established RAT such as 4G LTE for instance.

Backhaul communication interface 62 could be a network communication interface (e.g., an Ethernet network interface port and/or connection) through which the access node could communicate with various other network entities, such as with other access nodes and various core-network entities.

And controller 64, which could comprise a processing unit 68 (e.g., one or more general purpose microprocessors and/or one or more dedicated processors), non-transitory data storage (e.g., one or more volatile and/or non-volatile storage components) 70, and program instructions 72 stored in the data storage and executable by the processing unit, or could take other forms, could be operable to cause the access node to carry out various access-node operations as described herein.

Here too, various features described above could be carried out in this context as well, and vice versa.

The present disclosure also contemplates a computer readable medium having stored thereon (e.g., encoded with) program instructions executable by a processing unit to carry out various operations described above.

Exemplary embodiments have been described above. Those skilled in the art will understand, however, that changes and modifications may be made to these embodiments without departing from the true scope and spirit of the invention.

We claim:

1. A method for controlling connectivity of a user equipment device (UE), wherein the UE is dual-connectivity capable, the method comprising:
 detecting by the UE that the UE has ping-ponged at a threshold high rate between standalone connectivity and dual connectivity; and
 responsive to at least the detecting that the UE has ping-ponged at the threshold high rate between standalone connectivity and dual connectivity, transmitting by the UE, to a first access node serving the UE, a report including an indication that the UE is not dual-connectivity capable,
 wherein the first access node is configured to use the indication in the report as a basis to forgo configuring of dual connectivity for the UE,
 wherein each of a plurality of instances of the UE ping-ponging between standalone connectivity and dual connectivity comprises a sequence of steps selected from the group consisting of (i) the UE transitioning from standalone connectivity with the first access node to dual connectivity with the first access node and a second node and then back to standalone connectivity with the first access node and (ii) the UE transitioning from dual connectivity with the first access node and a second node to standalone connectivity with the first access node and then back to dual connectivity with the first access node and the second access node, and
 wherein detecting that the UE has ping-ponged at a threshold high rate between standalone connectivity and dual connectivity comprises detecting occurrence of at least a predefined quantity of the instances within a defined time period.

2. The method of claim 1, wherein the predefined quantity is at least two.

3. The method of claim 1, wherein the report is an updated UE capability report.

4. The method of claim 3, wherein the indication in the report is a feature group indicator bit that indicates that the UE is not dual-connectivity capable.

5. The method of claim 1, wherein forgoing configuring of dual connectivity for the UE comprises forgoing causing the UE search for coverage for a secondary connection for the UE.

6. The method of claim 1, wherein the UE has a primary air-interface connection between the UE and the first access node, and wherein forgoing configuring of dual connectivity for the UE comprises forgoing signaling for setup of a secondary air-interface connection between the UE and a second access node.

7. The method of claim 1, wherein the dual connectivity is EUTRA-NR dual connectivity (EN-DC), and wherein the standalone connectivity is standalone 4G LTE connectivity.

8. A method for controlling connectivity of a user equipment device (UE), wherein the UE is dual-connectivity capable, the method comprising:
 receiving from the UE, by a first access node serving the UE, a report indicating that the UE is not dual-connectivity capable, the report being generated and provided by the UE in response to at least the UE detecting that the UE has ping-ponged at a threshold high rate between standalone connectivity and dual connectivity; and
 using by the first access node the indication in the report as a basis to forgo configuring of dual connectivity for the UE,
 wherein each of a plurality of instances of the UE ping-ponging between standalone connectivity and dual connectivity comprises a sequence of steps selected from the group consisting of (i) the UE transitioning from standalone connectivity with the first access node to dual connectivity with the first access node and a second node and then back to standalone connectivity with the first access node and (ii) the UE transitioning from dual connectivity with the first access node and a second node to standalone connectivity with the first access node and then back to dual connectivity with the first access node and the second access node, and
 wherein detecting that the UE has ping-ponged at a threshold high rate between standalone connectivity and dual connectivity comprises detecting occurrence of at least a predefined quantity of the instances within a defined time period, the predefined quantity being at least two.

9. The method of claim 8, wherein forgoing configuring of dual connectivity for the UE comprises forgoing causing the UE search for coverage for a secondary connection for the UE.

10. The method of claim 8, wherein forgoing configuring of dual connectivity for the UE comprises forgoing signaling for setup of a secondary air-interface connection between the UE and a second access node when the UE has a primary air-interface connection between the UE and the first access node.

11. A user equipment device (UE) configured to use capability reporting based on ping-ponging as a way to control connectivity of the UE, wherein the UE is dual-connectivity capable, the UE comprising:
 a wireless communication interface for engaging in air interface communication, wherein the wireless communication interface supports dual connectivity;
 a controller configured to (i) detect that the UE has ping-ponged at a threshold high rate between standalone connectivity and dual connectivity and (ii) responsive to at least the detecting that the UE has ping-ponged at the threshold high rate between standalone connectivity and dual connectivity, output for transmission to a first access node serving the UE a report including an indication that the UE is not dual-connectivity capable,
 wherein the indication in the report is useable by the first access node as a basis to forgo configuring of dual connectivity for the UE,
 wherein each of a plurality of instances of the UE ping-ponging between standalone connectivity and dual connectivity comprises a sequence of steps selected from the group consisting of (i) the UE transitioning from standalone connectivity with the first access node to dual connectivity with the first access node and a second node and then back to standalone connectivity with the first access node and (ii) the UE transitioning from dual connectivity with the first access node and a second node to standalone connectivity with the first access node and then back to dual connectivity with the first access node and the second access node, and
 wherein detecting that the UE has ping-ponged at a threshold high rate between standalone connectivity and dual connectivity comprises detecting occurrence of at least a predefined quantity of the instances within a defined time period.

12. The UE of claim 11, wherein the predefined quantity is at least two.

13. The UE of claim 11, wherein the report is an updated UE capability report.

14. The UE of claim 13, wherein the indication in the report is a feature group indicator bit that indicates that the UE is not dual-connectivity capable.

15. The UE of claim 11, wherein forgoing configuring of dual connectivity for the UE comprises forgoing causing the UE search for coverage in which to configure a secondary connection for the UE.

16. The UE of claim 11, and wherein forgoing configuring of dual connectivity for the UE comprises forgoing signaling for setup of a secondary air-interface connection between the UE and a second access node when the UE has a primary air-interface connection between the UE and the first access node.

17. The UE of claim 11, wherein the dual connectivity is EUTRA-NR dual connectivity (EN-DC), and wherein the standalone connectivity is standalone 4G LTE connectivity.

18. The UE of claim 11, wherein the controller comprises at least one processor, non-transitory data storage, and program instructions in the non-transitory data storage, the program instructions being executable by the at last one processor.

* * * * *